United States Patent
Klethy et al.

(10) Patent No.: US 9,579,854 B2
(45) Date of Patent: Feb. 28, 2017

(54) METHOD FOR MAKING A REINFORCEMENT PROVIDED WITH AT LEAST ONE ADHESIVE SURFACE CAPABLE OF BEING REPOSITIONED AND RESULTING REINFORCEMENT

(75) Inventors: Thierry Klethy, Brangues (FR); Frederic Pinan, Courcelles/Viosne (FR)

(73) Assignee: SAERTEX FRANCE, Brangues (FR)

( * ) Notice: Subject to any disclaimer, the term of this patent is extended or adjusted under 35 U.S.C. 154(b) by 530 days.

(21) Appl. No.: 10/586,483

(22) PCT Filed: Jan. 21, 2005

(86) PCT No.: PCT/FR2005/050037
§ 371 (c)(1),
(2), (4) Date: Jan. 30, 2007

(87) PCT Pub. No.: WO2005/075168
PCT Pub. Date: Aug. 18, 2005

(65) Prior Publication Data
US 2007/0163707 A1   Jul. 19, 2007

(30) Foreign Application Priority Data
Jan. 22, 2004  (FR) .................................... 04 50119

(51) Int. Cl.
*B29C 70/48* (2006.01)
*B29C 70/54* (2006.01)
*B29B 11/16* (2006.01)
*B32B 37/12* (2006.01)

(52) U.S. Cl.
CPC ............. *B29C 70/541* (2013.01); *B29B 11/16* (2013.01); *B29C 70/543* (2013.01); *B32B 37/1284* (2013.01); *B29C 70/48* (2013.01); *B32B 2037/1215* (2013.01); *C09J 2201/606* (2013.01); *C09J 2201/61* (2013.01); *Y10T 428/14* (2015.01)

(58) Field of Classification Search
CPC ........ B29C 70/30; B29C 70/34; B29C 70/345; B29C 70/48; B29C 70/541; B29C 70/543; B32B 2037/1215; B32B 37/1284; C09J 2201/606; C09J 2201/61
USPC ........ 156/152, 181, 245, 289; 264/257, 258; 427/208.2, 422, 427.4
See application file for complete search history.

(56) References Cited

U.S. PATENT DOCUMENTS

| | | | | |
|---|---|---|---|---|
| 3,925,282 A | * | 12/1975 | Davis et al. | 524/272 |
| 4,139,591 A | | 2/1979 | Jurisich | |
| 4,151,319 A | * | 4/1979 | Sackoff et al. | 428/41.4 |
| 4,349,599 A | * | 9/1982 | Adams | 442/151 |
| 5,000,990 A | * | 3/1991 | Freeman | 428/36.1 |
| 5,071,711 A | * | 12/1991 | Heck et al. | 428/542.8 |
| 5,080,851 A | * | 1/1992 | Flonc et al. | 264/258 |
| 5,217,766 A | | 6/1993 | Brace et al. | |
| 5,445,848 A | | 8/1995 | Venzi et al. | |
| 6,447,705 B1 | * | 9/2002 | Fowler et al. | 264/255 |

FOREIGN PATENT DOCUMENTS

| | | | |
|---|---|---|---|
| GB | 1143571 A | * | 2/1969 |
| WO | WO 94/26505 A1 | * | 11/1994 |

* cited by examiner

*Primary Examiner* — Michael Tolin
(74) *Attorney, Agent, or Firm* — Young & Thompson

(57) ABSTRACT

The object of the invention is a process for the production of a fiber-based armature particularly adapted to be embedded in at least one matrix, characterized in that it consists in performing the following steps:
   preparing a fiber-based material, and
   depositing on at least one of the surfaces of the material thus obtained a repositionable glue.
The invention also covers the obtained armature.

9 Claims, No Drawings

METHOD FOR MAKING A REINFORCEMENT PROVIDED WITH AT LEAST ONE ADHESIVE SURFACE CAPABLE OF BEING REPOSITIONED AND RESULTING REINFORCEMENT

The present invention relates to a process for the production of an armature having at least one adhesive surface so as to be repositionable.

The invention also covers the armature thus obtained.

The production of composite materials based on one or several armatures embedded in a matrix or a mixture of matrices is more and more used for the production of industrial pieces, in very numerous applications relating to sports, components of vehicles for example.

Several processes exist for the production of such pieces. A known method which will be given to illustrate the prior art and the interest of the present invention, consists in molding a piece by injection in a two-part mold, a matrix as the lower part and a punch as the upper part, to a conjugated shape to coact with the matrix and to ensure the shaping of the piece.

The first step consists in placing pieces of fiber-based material in a mold. These fiber-based materials are selected from an infinite variety: glass fibers are widely used for their good mechanical properties and their attractive price and carbon or aramide fibers for their excellent mechanical properties.

In the description that follows, there is meant by fibers the fibers or fabricated filaments such as filaments or fibers of glass but also all the filaments and mixtures of filaments of synthetic or natural origin.

These materials are often non-woven, made from one or several superposed layers as a function of the desired mechanical properties or as a function of the final surface condition sought, to cite only these parameters.

The production of these non-woven materials is sensitive and the positioning, orientation, length, and diameter of the fibers are also parameters to control.

These parameters are also connected to the nature of the molding and the type of resin. Once these pieces of fiber-based material are disposed in the mold, generally received in the matrix, the punch of this mold is positioned and there is injected, generally at several carefully selected points, resin which distributes itself in the mold by flow through the fibers, this according to the desired production mode. There are also interactions between the parameters of the fibers and those of the resin, to which must be added the interactions arising from the profiles of the pieces to be produced.

The first problem is to be able to drape the matrix of the mold with the fiber-based material forming the armature, which is the less easily shaped as it is thick or dense or even strongly assembled. Thus, the material matches only with difficulty the geometry of the mold, more particularly that of the matrix but also the more that of the punch, leading to a less precise positioning of the piece of cutout fiber-based material, erroneous positioning which is discovered once the introduced resin will have polymerized.

This type of production is not as simple as that which has been described, because the fabricated pieces are more and more complex. In fact, reinforcements are required in certain places. These reinforcements are thus produced by superposition of several layers of the same fiber-based material or another material, in a region and according to a suitable and precise geometric configuration.

This gives rise to a worsening of the original problem, because it is necessary to be able to shape this reinforcement according to the given geometry, with a great total thickness of the assembly.

As the piece has even smaller dimensions, it is difficult for the operator to shape the edges of this piece of reinforcement.

Moreover, the piece is not held by any element, and in certain cases it can move at the time of the movement of the elements of the mold or under the effect of flow under pressure of the resin, giving rise to reinforcement in an undesired place whilst the desired place lacks reinforcement. The complete piece is then scrapped.

In other cases, the reinforcement or a piece must be positioned preferably on the punch but in the face of known fiber-based materials this is impossible because the reinforcement or the piece falls under the influence of gravity.

In fact, to overcome this drawback, operators use aerosol spray cans of glue to secure the pieces. First of all, this is less practical because the glue adheres too slowly, rendering the operation long, or if rapid and final, preventing any repositioning arising from a fault in positioning.

It will also be noted that it is a matter of using aerosols in an industrial medium, which is controlled by particular legislation, and the cost of such use is far from being negligible.

The object of the present invention is a process for production of a fiber-based armature, for example in the form of a mat of non-woven material, which overcomes the drawbacks of the existing products, particularly by permitting a precise positioning, a positioning but also a repositioning if necessary, while keeping the cost acceptable.

The invention also covers the obtained product.

The description which follows permits better understanding the invention, which is illustrated by non-limiting examples of embodiment.

The process consists in preparing a fiber-based armature, in depositing on at least one of the surfaces of the armature thus obtained a repositionable glue, and in pressing a removable separator on the surface having received said layer of repositionable glue.

The sheets can then be cut off and stacked or more generally rolled up.

The repositionable glue is selected in a suitable manner by adjusting its mechanical properties and such that it will be compatible with a resin used without giving rise to pollution.

Thus, it is absolutely necessary that the glue does not give rise to pollution of the resin by modifying the characteristics of the final product, by limiting the connections of fibers and the resin or resins constituting the matrix of the final product.

For this armature, the mechanical parameters in question are more particularly the sticking power also called "tack", the resistance to delamination, the resistance to tearing off and the variations of characteristics as a function of temperature.

This glue is preferably deposited at the outlet of production of this armature, by spraying. Preferably, the glue is selected from "hot melt" glues so as to permit an almost instantaneous setup on the surface of the fibers so as to be able to superpose thereon as a separator for example, a suitable sheet of paper. Moreover, the hot melt glues do not contain solvents. The nature of the paper must permit a removal of this paper without the fibers of the reinforcement being pulled out and without destroying the reinforcement.

The use of an armature thus produced is greatly simplified for the operator.

Thus, the latter cuts off the armature reinforcement with the separator and can adjust this reinforcement in the matrix of a mold or on a punch for example without destroying the reinforcement which is held to its original dimensions by the paper.

After removal of the separator, the operator can place the cutoff piece, in the same direction, which is to say with the surface bearing the glue against the matrix or the punch. The armature piece grips this bottom in the best manner because the shape is matched without thereby altering the structure of the reinforcement and the operator enjoys all the flexibility of the armature without being hindered by the separator, which has been removed.

In this arrangement with the armature according to the invention, the thickness of the reinforcement is maintained over all its surface because only the surface is fixed without giving rise to adhesion of the fibers together constituting the armature, which could have the result of decreasing in places the thickness. The glue is thus present only on the surface.

There will be no more false positioning in the regions of sharp curvature. Similarly, the piece is better adjusted because during cutting off, the reinforcement is not stretched, not even involuntarily by the operator. There is thus always the desired quantity of fibers in the region in question.

If the piece is large or complicated and its positioning is sensitive, the repositionable nature of the glue permits partial or total removal of the piece for repositioning.

During injection of resin and its flow through the fibers, there is no possible movement of the piece.

The product produced according to the process of the present invention is of interest most particularly when the operator desires to position reinforcements. He can thus cut off a reinforcement directly in the armature with its separator, prepared as a function of the geometry and adjust it. Once this operation is completed, the reinforcement is ready and it suffices to take off the separator and to position this reinforcement on the principal piece already in place and perfectly adjusted. The reinforcement is emplaced with its surface provided with repositionable glue against the surface free from glue of the material constituting the principal piece.

The reinforcement is thus maintained in place on the principal piece even if the radii of curvature are small or if the material constituting the reinforcement is less flexible. The injection with glue and its flow cannot change the position of this reinforcement on the principal piece.

Similarly, if the reinforcement is not provided on the principal piece but must be positioned on the punch of the mold, one can provide the use of the reinforcement with its surface provided with repositionable glue facing the punch so that it can remain in place despite gravity.

A particular use for products obtained according to the process of the present invention, is for inserts.

It is known that industrial pieces are provided with inserts for their securement on a support or on the contrary to receive elements after mounting.

These inserts must thus be placed previously. The contours generally match the sharp angles or the curves of small radius rendering delicate the operation of draping.

If the piece is cut off and provided with repositionable glue, it is possible to cause the reinforcement to adhere over all the surfaces of the insert even though after polymerization of the resin, the insert is embedded in a suitable fashion and has the best mechanical qualities.

The insert can also be of a different nature and particularly there can be foam cores which must be embedded at precise points. The product with adjusted drapage according to the present invention is also perfectly suitable, its use being the same as for metallic inserts.

Such a core can even be draped outside the mold with one or several layers and then returned to its proper place in the mold, permitting a great and appreciable saving of time, industrially as well as financially.

According to the present invention, there is provided a supplemental step of the process which consists in depositing the repositionable glue on the upper surface of the fiber-based armature.

Because of this, the cutout pieces can adhere to two surfaces. In the case of an insert or a foam core, the area of the insert or the core is draped and then there is inserted the insert or the core thus draped, which remains pressed against the correct location in the mold.

Tests show that a reduced quantity of glue is necessary, of the order of several grams per square meter for a thermo-fusible organic rubber glue resisting a temperature of 115° C., applicable to reinforcements of glass fiber comprised between 0.1 mm and 10 mm thickness and a density comprised between 10 $g/m^2$ and 5,000 $g/m^2$.

The invention claimed is:

1. A process for the production and the use in moulding of a fiber-based armature particularly adapted to be embedded in a matrix or a mixture of matrices, comprising the steps of:

preparing a layer of fiber-based non-woven material having one exterior surface of fibers;

depositing a repositionable hot melt glue in liquid form on said one exterior surface of fibers to form one adhesive exterior surface on the layer of fiber-based non-woven material, the hot melt glue having an almost instantaneous setup on the one exterior surface of the fibers;

pressing a removable separator onto the one adhesive exterior surface so that the removable separator adheres to the one adhesive exterior surface;

removing the pressed separator from the one adhesive exterior surface;

cutting a piece from the layer of fiber-based non-woven material to conform to the configuration of a mould to enable positioning of the cut piece in the mould, said piece having one adhesive exterior surface;

positioning the piece on a wall of the mould or on another piece of fiber-based non-woven material previously positioned in the mould such that the one adhesive exterior surface of the piece directly contacts either the wall of the mould or the another piece of fiber-based non-woven material;

wherein removing the pressed separator from the one adhesive exterior surface is carried out after cutting the piece from the layer of fiber-based non-woven material to conform to the configuration of a mould to enable positioning of the cut piece in the mould; and wherein the repositionable glue provides the one adhesive exterior surface with a repositionable nature such that the piece can be adhered upon contact with either the wall of the mould or the another piece of fiber based non-woven material, positioned and subsequently partially or completely removed from the wall of the mould or of the another piece of fiber-based non-woven material and re-positioned during the positioning step without any degradation of the piece or of the already positioned fiber non-woven material.

2. The process for the production of a fiber-based armature according to claim 1, wherein the piece is positioned on another piece of fiber-based non-woven material previously positioned in the mould.

3. The process for the production of a fiber-based armature according to claim 2, comprising the further step of:
injecting resin within the mould after positioning the piece in the mould or on the another non-woven fiber-based material.

4. The process for the production of a fiber-based armature according to claim 1, further comprising a step of cutting said layer of fiber-based non-woven material into sheets or a step of rolling up said layer of fiber-based non-woven material after pressing the removable separator onto the one adhesive exterior surface and before cutting a piece from the layer of fiber-based non-woven material to conform to the configuration of a mould.

5. The process for the production of a fiber-based armature according to claim 1, further comprising a step of selecting the repositionable glue by adjusting its mechanical properties such that it will be compatible with the matrix used without giving rise to pollution.

6. The process for the production of a fiber-based armature according to claim 1, wherein the repositionable glue is deposited on the one exterior surface by spraying.

7. The process for the production of a fiber-based armature according to claim 1, wherein the fiber based non-woven material consists of fibers selected from the group consisting of glass, carbon aramide and combinations thereof.

8. A process for the production of a fiber-based armature embedded in a matrix or a mixture of matrices, comprising the steps of:
providing a fiber-based armature comprising a mat of fiber-based non-woven material having an adhesive exterior surface formed by fibers of the mat onto which a repositionable glue has been deposited and a removable separator has been pressed onto the adhesive exterior surface;
removing the separator from the adhesive exterior surface;
adhering the armature to a mould by placing the armature in a mould and contacting the mould with the adhesive exterior surface, the repositionable glue holding the armature in position within the mould; and
injecting resin to flow through fibers of the armature,
wherein the repositionable glue permits partial or total removal of the non-woven material before injecting the resin and prevents movement while injecting the resin.

9. A process for the production of a fiber-based armature to be embedded in a matrix or a mixture of matrices, comprising the steps of:
preparing a fiber-based non-woven material having an exterior surface of fibers;
depositing a repositionable hot melt glue in liquid form on said exterior surface of the material to provide an adhesive exterior surface of fibers, the hot melt glue having an almost instantaneous setup on the one exterior surface of the fibers;
pressing a removable separator the adhesive exterior surface;
removing the separator from the adhesive exterior surface, said separator permitting removal without pulling out fibers from the non-woven material;
adhering the non-woven material to a mould by placing the non-woven material in the mould and contacting the mould with the adhesive exterior surface, the glue holding the non-woven material in position within the mould; and
injecting resin to flow through fibers of the non-woven material,
wherein the repositionable glue provides the one adhesive exterior surface without giving rise to adhesion of the fibers together constituting the non-woven material and resulting in a decrease in thickness, and
wherein the repositionable glue permits partial or total removal of the non-woven material before injecting the resin and prevents movement while injecting the resin.

* * * * *